United States Patent [19]

Girguis

[11] Patent Number: 4,575,362
[45] Date of Patent: Mar. 11, 1986

[54] CONSTANT VELOCITY JOINT

[76] Inventor: Sobhy L. Girguis, Magdalenenstrasse 19, D-5210 Troisdorf-Oberlar, Fed. Rep. of Germany

[21] Appl. No.: 529,610

[22] Filed: Sep. 6, 1983

[30] Foreign Application Priority Data

Sep. 11, 1982 [DE] Fed. Rep. of Germany ....... 3233753

[51] Int. Cl.$^4$ .............................................. F16D 3/21
[52] U.S. Cl. ..................................... 464/145; 464/906
[58] Field of Search .......... 464/145, 146, 906, 139-143

[56] References Cited

U.S. PATENT DOCUMENTS

| | | | |
|---|---|---|---|
| 2,046,584 | 7/1936 | Rzeppa | 464/146 X |
| 3,475,924 | 11/1969 | Aucktor | 464/145 X |
| 3,934,429 | 1/1976 | Takahashi et al. | 464/906 X |
| 4,156,353 | 5/1979 | Welschof | 464/145 |
| 4,188,803 | 2/1980 | Otsuka et al. | 464/906 X |
| 4,231,232 | 11/1980 | Otsuka et al. | 464/146 |
| 4,494,941 | 1/1985 | Hirai et al. | 464/145 |

FOREIGN PATENT DOCUMENTS

| | | |
|---|---|---|
| 2430025 | 1/1976 | Fed. Rep. of Germany . |
| 2430026 | 1/1976 | Fed. Rep. of Germany . |
| 2430109 | 1/1976 | Fed. Rep. of Germany . |

Primary Examiner—John Petrakes
Attorney, Agent, or Firm—Hayes Davis & Soloway

[57] ABSTRACT

A constant velocity joint is provided with an outer part, in the inner surface of which tracks are provided, an inner part, on the outer surface of which corresponding tracks are provided, and with balls in a pivotable cage located in the space between the outer part and the inner part. Taking as a basis the particular axial displacement, caused by the torque, of the outer part and the inner part in relation to the cage, this displacement depending mainly on the amount of the respective axial clearances of the pairs of centering surfaces and/or on the brinelling of the window support surfaces by the balls in the running-in phase and also on the elastic flexibility of the parts, the running-in wear and the thermal expansion, the tracks of the outer part run in a mirror image with the corresponding tracks of the inner part in relation to the ball plane.

19 Claims, 11 Drawing Figures

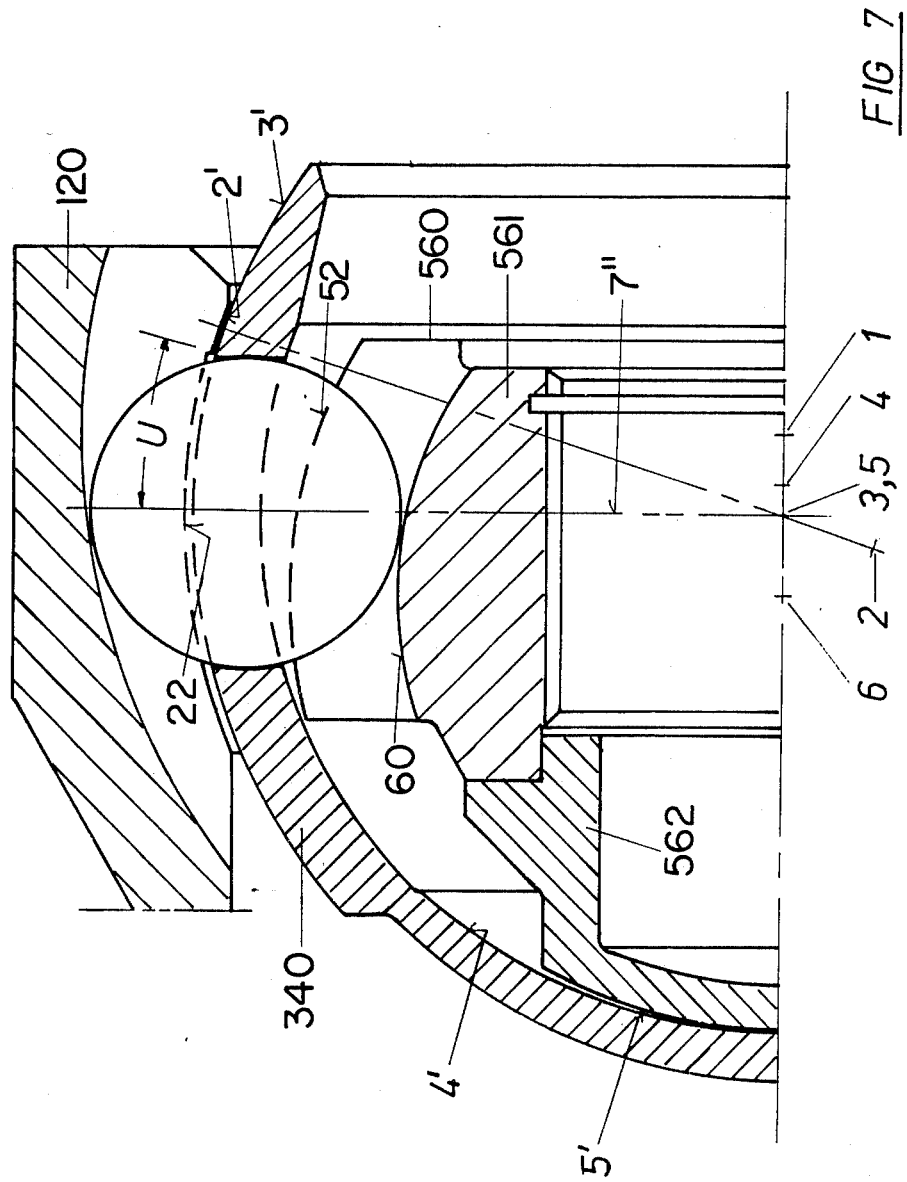

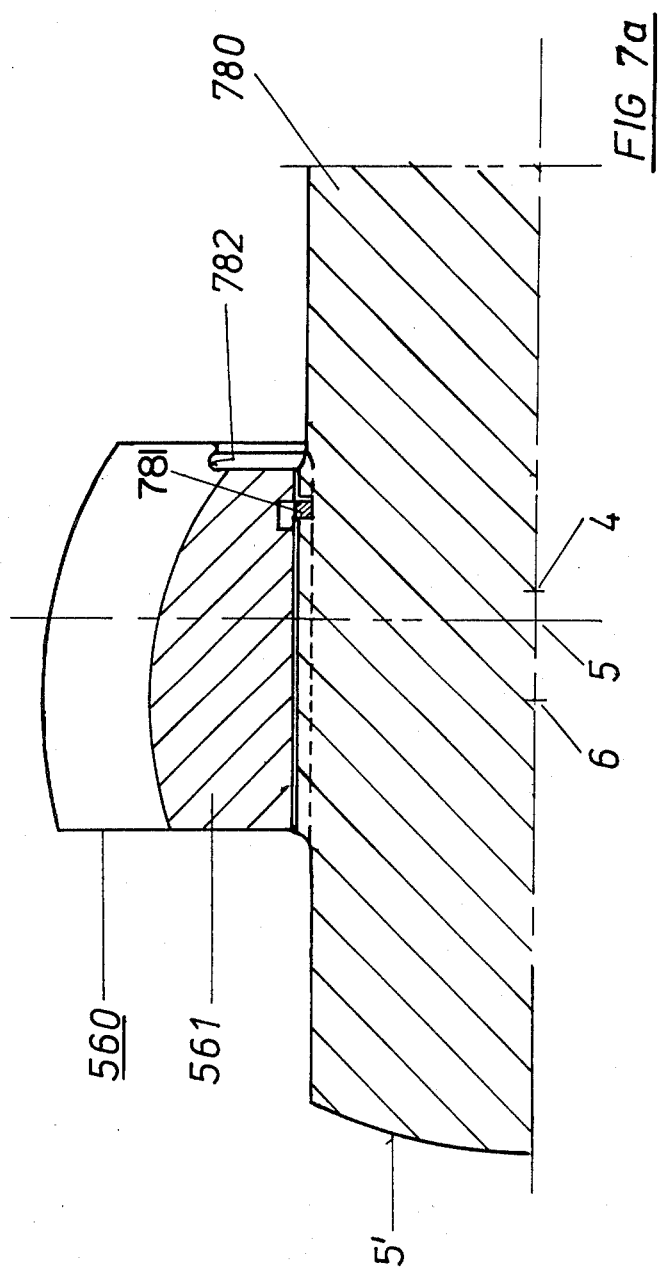

CONSTANT VELOCITY JOINT

The invention relates to a constant velocity joint.

Figure 3:
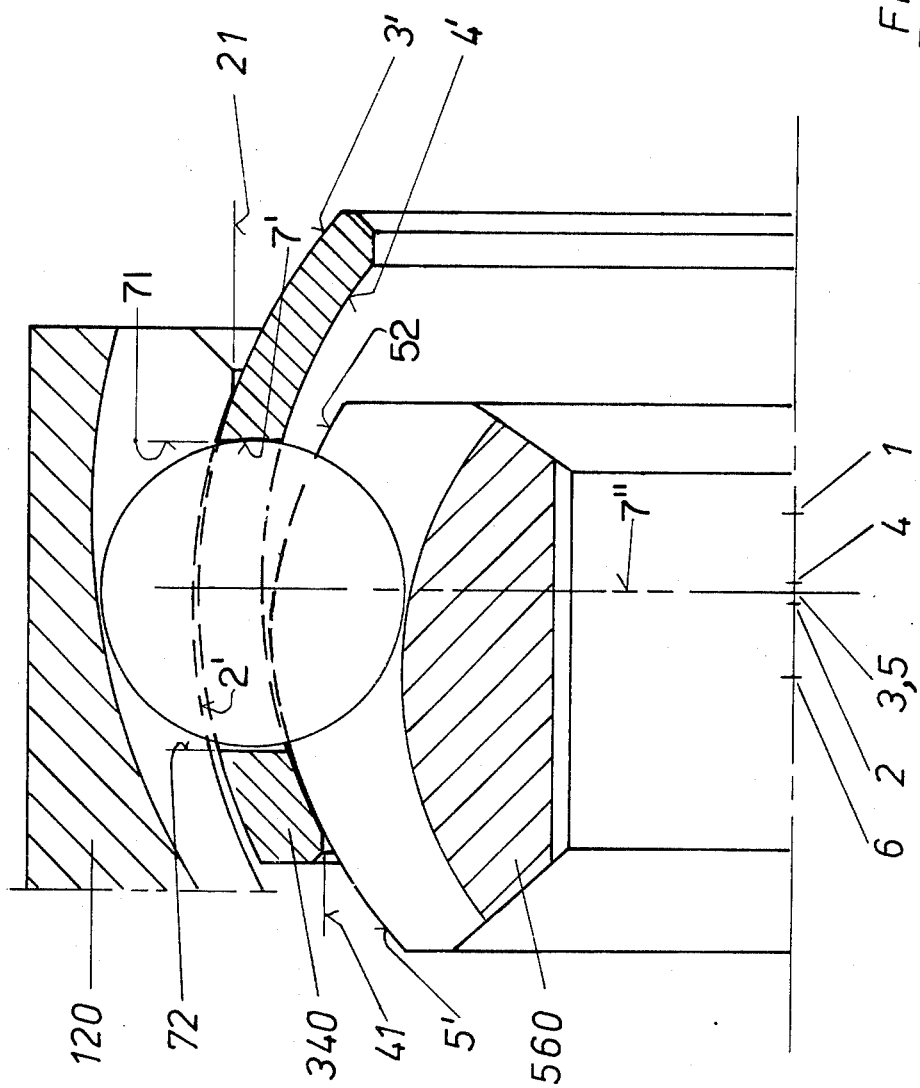
Figure 5:
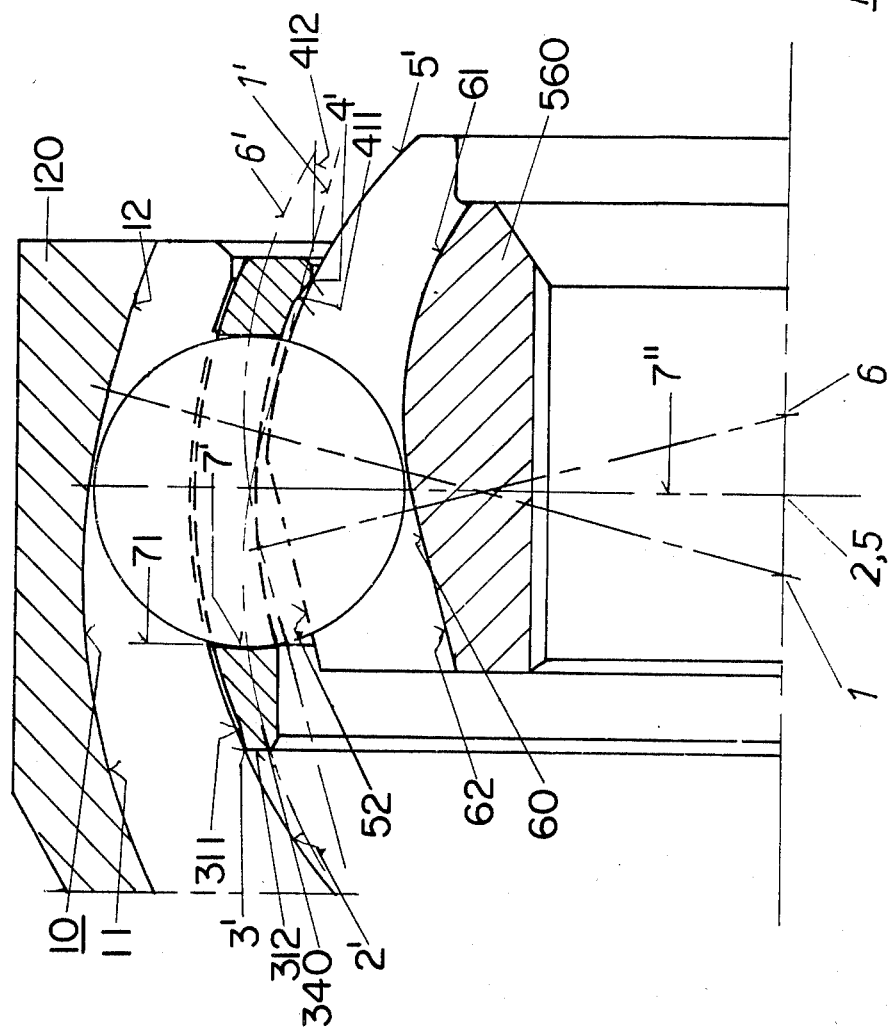
Figure 9:
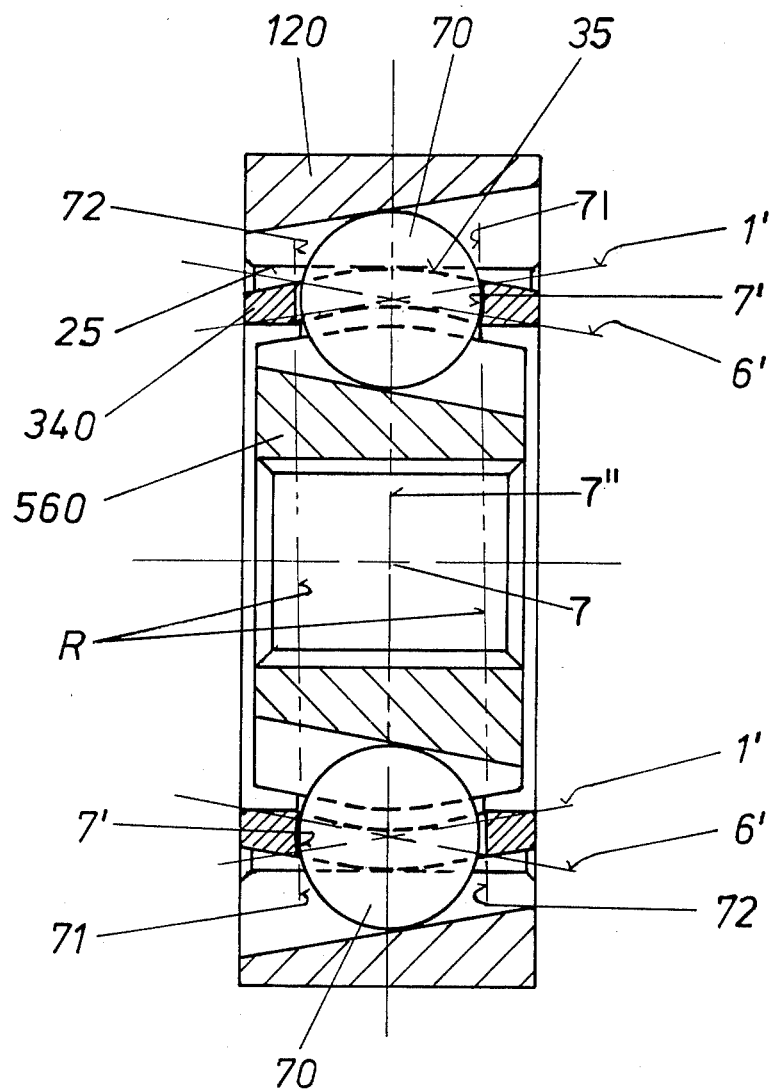

The constant velocity joint concerned belongs to the track-steered ball-joint type, in which the homokinetic plane is controlled by the intersecting tracks of the outer and inner parts. U.S. Pat No. 2,046,584, FIG. 3 or FIG. 9, shows a design of this type as a fixed joint with tracks running in meridian planes, the control principle being shown in FIG. 1. To satisfy the requirement of constant velocity, this patent stipulates that the spherical centering surfaces of the inner part, outer part and cage be arranged concentrically with a common center point located in the ball plane. The centering surfaces extend on both sides of the plane of symmetry or ball plane. Furthermore, the axial distance between the center point of the centering surface of the outer part and the center point of the tracks of the outer part (called the outer-part offset) should be equal to the axial distance between the center point of the centering surface of the inner part and the center point of the tracks of the inner part (called the inner-part offset). When the center point of the track of one part is not located on its axis of rotation (for example, FIG. 5), the offset corresponds to the distance between the center point of the centering surface of this part and the point of intersection of the axis of rotation with the plane extending perpendicularly to the track and containing the ball center point (FIG. 5, point c and point b respectively.) The tracks of the outer part are therefore a mirror image of the tracks of the inner part, seen from the ball plane.

However, the four spherical centering surfaces cannot basically be kept concentric, as long as there is a clearance fit between the pairs of mating surfaces, so that the condition of constant velocity can be guaranteed only with clearance-free mating surfaces. In fact, the parts are loaded axially as a result of torque transmission, more specifically the outer and inner parts in the direction of the transmission points and the balls and the cage in the opposite direction. If the centering surfaces are assembled with a clearance, as is absolutely unavoidable in practice, the parts are displaced correspondingly, so that the distance between the ball plane and the center point of the tracks of the outer part (called the outer-part lever arm) gets shorter, and the distance between the ball plane and the center point of the tracks of the inner part (called the inner-part lever arm) gets longer than the respective offset values. As a result, the tracks of the outer part are no longer a mirror image of the tracks of the inner part, seen from the ball plane, or the equality of the lever arms, which is, in fact, decisive for an accurate control of constant velocity, is already disturbed twice. The particular axial displacement depends primarily on the radial clearance and on the width of the centering surfaces, as measured from the ball plane in the direction of the respective points of contact; the smaller the width, the greater the axial displacement. To allow the joint parts to be assembled, the width of the parts must be kept within limits, as is known per se, and accordingly the particular axial displacement amounts, as a rule, to a multiple of the radial clearance.

Because of the displaced mirror image or the unequal lever arms and the axially displaced centering surfaces, the control of the ball plane in the angle-bisecting plane is disturbed, with the result that, among other factors, the balls are loaded very unequally, or one-sidedly, when the joint is angled, in comparison with joints controlled accurately, and consequently the performance of the joint in terms of torque and endurance is reduced considerably. Moreover, the joint tends to produce clicking noises.

These disadvantages can, in practice, be kept within limits only by pairing the centering surfaces with only very small clearance. However, a small clearance fit of the centering surfaces is incompatible with thermal expansion and also makes it necessary for the parts, expecially the outer part, to be made massive, so as to keep their elastic deformation within the given narrow clearance. Furthermore, a narrow clearance fit of the centering surfaces entails greater restrictions in the production accuracies of the joint parts. In the first place, the concentricity between the tracks and the centering surface of both the outer and the inner part must be kept within even narrower tolerances. In fact, the inner part is centered radially, in the main direction of the ball plane, with respect to the outer part mainly by the geometry of the tracks and balls, while under the influence of the torque, the centering is mainly decieded by the transmission forces on the balls. If, along the ball plane, the eccentricity between the tracks and the centering surface of the outer part and/or inner part is greater than the radial clearances of the centering surfaces, the cage is jammed radially on one side between the outer and inner parts. Centering is overdefined, and the balls are already loaded unequally even in the straight position. Exact concentricity of the centering surfaces of the cage is likewise necessary for the same reasons.

A narrow clearance fit therefore means that the joint designs according to the state of the art also involve high production costs, cause high temperatures, which endanger to the lubricant film to a high degree, and are subject to a certain danger of seizure between the cage and the outer or inner part, which for example, may lead to fatal consequences in motor vehicles with front-wheel drive.

A further feature of this known type of joint is the high point loading between the balls and the window support surfaces, which leads, during a relatively short running-in period to significant plastic deformation or brinelling of the window support surfaces. As a result, the ball plane is further displaced axially in the main loading direction, and is no longer symmetrical to the cage centering surfaces, after which the outer-part lever arm becomes even shorter and the inner-part lever arm becomes even longer, or the mirror images of the tracks are disturbed more seriously, with the result that the individual balls, tracks and window surfaces are subjected to an even more extreme load.

Various methods of solving the problem of the point loading of the window support surfaces are known, such as those described in W. German Pat. Nos. 2,430,109, 2,430,026 and 2,430,025. In the first two solutions, the natural shape of the balls is disturbed by the flattened portions or by cylindrical regions in the cage windows, with which they are prevented from rolling freely in the tracks of the outer and inner parts, resulting in an increase of the sliding friction, thus leading to an increase in temperature and to a reduction of the endurance. Additional parts are proposed according to W. German Patent Specification No. 2,430,025, but these involve extra costs, losses in accuracy and a further space requirement.

Further inaccuracies in the mirror image of the tracks or in the equality of the control lever arms of the joints according to the state of the art arise as a result of the elasticity of the parts, running in wear or thermal expansion, whether momentary or at a constant temperature.

The object of this invention is to substantially eliminate the disadvantages mentioned above, especially by providing accurate or more accurate control conditions.

According to the invention, there is provided a constant velocity joint with a hollow outer part, in the inner surface of which tracks are provided, an inner part which is located in the outer part and on the outer surface of which corresponding tracks are provided, with balls each being received in a track of the outer and inner part for torque transmission, a cage which is located in the space between the outer and inner parts maintaining the balls in the homokinetic or ball plane by means of windows and which is pivotably fixed respectively centered to the inner and/or outer part, with a clearance fit, the tracks of the outer and inner parts not extending parallel to the main axis, at least in the low joint angle range, so that, with the joint in the straight position and under torque, the contact or transmission points of the balls in relation to the tracks of both the outer and inner parts are located on one side of the homokinetic plane, and that the balls are held axially on the other side of the homokinetic plane by means of window support surfaces or window surfaces, wherein, considering the respective axial displacement, caused by the torque, of the outer part and the inner part in relation to the cage in one direction and of the balls in the opposite direction, this displacement depending mainly on the amount of the respective axial clearances of the pairs of centering surfaces and/or on the brinelling of the window support surfaces by the balls in the running-in phase, further on the elasticity of the parts, the running-in wear and the thermal expansion, the tracks of the outer part run in a mirror image with the corresponding tracks of the inner part in relation to the ball plane.

Thus, the accuracy of the track control is achieved after eliminating the sources of error irrespective of their individual magnitudes. For example, the clearances between the centering surfaces can be decided to their best possible values more freely and do not need to be minimized. Brinelling of the window support surfaces as such is then practically no longer a disadvantage, inasmuch as certain production inaccuracies of the window support surfaces or certain eccentricities of the functional surfaces can advantageously be corrected or compensated as a result of the plastic deformation.

An overall advantage of a control which can be realized with high accuracy is the fact that the lever-arm dimensions can simply be reduced, the consequence of which is that the minimum track depths of both the outer and inner parts can be increased, furthermore that the axial force vector is reduced, as a result of which the performance data of the joint as a whole are further improved.

The main idea on which the invention is based is that the direction of the sum of all the forces acting on the window surfaces remains unchanged both in the straight position of the joint and in its angled position, and also that centering by means of a close clearance fit of the centering surfaces along the ball plane is superfluous.

In one improved construction of the invention, to improve a constant velocity joint, in which the inner surface of the outer part and the outer surface of the inner part respectively as well as the outer and inner surfaces of the cage are predominantly spherical and in which the outer and inner surfaces of the cage are made concentric, wherein the outer-part offset is greater than the constructive nominal size of the lever arms, specifically by an amount corresponding to and compensating the sum of all the axial displacements essentially as a result of play and also as a result of elastic deformation, running-in wear and thermal expansion between the outer part and the cage, and/or the inner-part offset is less than the constructional nominal size of the lever arms, specifically by an amount corresponding to and compensating the sum of all the axial displacements mainly as a result of play and also as a result of elastic deformation, running-in wear and thermal expansion between the inner part and the cage, and/or the ball plane lies asymmetrically relative to the plane of symmetry of the centering surfaces of the cage by an amount corresponding to and compensating the axial displacement of the ball plane in relation to the cage essentially as a result of the brinelling as well as a result of the elastic deformation of the cage support surfaces.

To maintain the centering or fixing accuracy of the joint even for relatively large angular ranges, one of the centering surfaces between the outer part and the cage has, on the side of the window support surfaces, or one of the centering surfaces between the cage and the inner part has, on the side of the transmission points a greater arc length than the respective opposing surface or bearing surface and serves as a guide surface, and wherein the guide surfaces are made exactly spherical with their center point in the ball plane.

As a result of these measures, the relatively narrow counterpiece or relatively narrow joint part is guided accurately by the guide surface so as to be pivotable spherically. The guide surface can be both the outer surface (convex) or the inner surface (concave) of a pair of surface. By means of this embodiment, the axial clearance between the centering surfaces can be compensated by constructive means in the main loading direction.

When the arc length of the guide surfaces on both sides of the bearing surface corresponds at least approximatey to an amount of about half the maximum operating joint angle, the bearing surfaces are always in contact with the guide surfaces over their full periphery, so that both the control accuracy and the support provided for the axially acting forces are guaranteed to the best possible extent over the entire angle range of the joint.

The invention proposes, further, that the bearing surface be circular, so that linear contact with the guide surface is obtained.

A very important and inventive design of the constant velocity joint envisages that the surface or surefaces of revolution adjacent to the bearing surface is finished, preferably produced in one chucking operation together with the bearing surface.

By producing the adjacent surfaces in one operation, such as grinding, the accuracy of the bearing surface is increased. A chamfer or a plane surface can be assumed as an adjoining surface. This feature also results, independently of the mirror-image accuracy of the tracks, according to the invention, in an improvement in the steering conditions.

If a line contact of this type adapts itself to be wider in the course of a certain running-in time, the corresponding axial displacement must be taken into account in the determination of the lever arms.

It is proposed, according to a further feature of the invention, that the bearing surface be made spherical with the same radius as the guide surface.

By this measure, surface contact is produced, whereby the surface pressure on the centering surfaces is reduced, furthermore the arc length of the guide surface can be shortened correspondingly.

In some applications, for example at high speeds, it is advantageous to assure the lubricant film between the centering surfaces by means of a wedge effect of the lubricant. It is therefore also proposed that the bearing surface in the longitudinal section and/or cross-section is realised with a certain conformity to the guide surface. This measure likewise results, independently of the mirror-image design according to the invention, in an improvement in the control conditions.

As is known per se, the application of conformity entails a reduction in production accuracies.

Since according to this invention no special requirements apart from the guide or bearing surfaces are imposed for the joint, the adjoining remaining surfaces not serving as a guide nor as a bearing surface on the outer surfaces or inner surfaces in the region of the pivoting movement of the joint parts can be at a distance from the center point of the guide surfaces which in the case of convex surfaces is less than and in the case of concave surfaces is greater than the radius of the guide surfaces.

A free design of the surfaces not involved in the function of fixing or centering can, depending on the particular embodiment, lead to optimise the construction, to a considerably easier production of the parts, and to a simpler assembly and will contribute to a potential improvement and reduction in the cost of the joints. As a rule, only the requirements of the track depth have to be considered.

Figure 1:
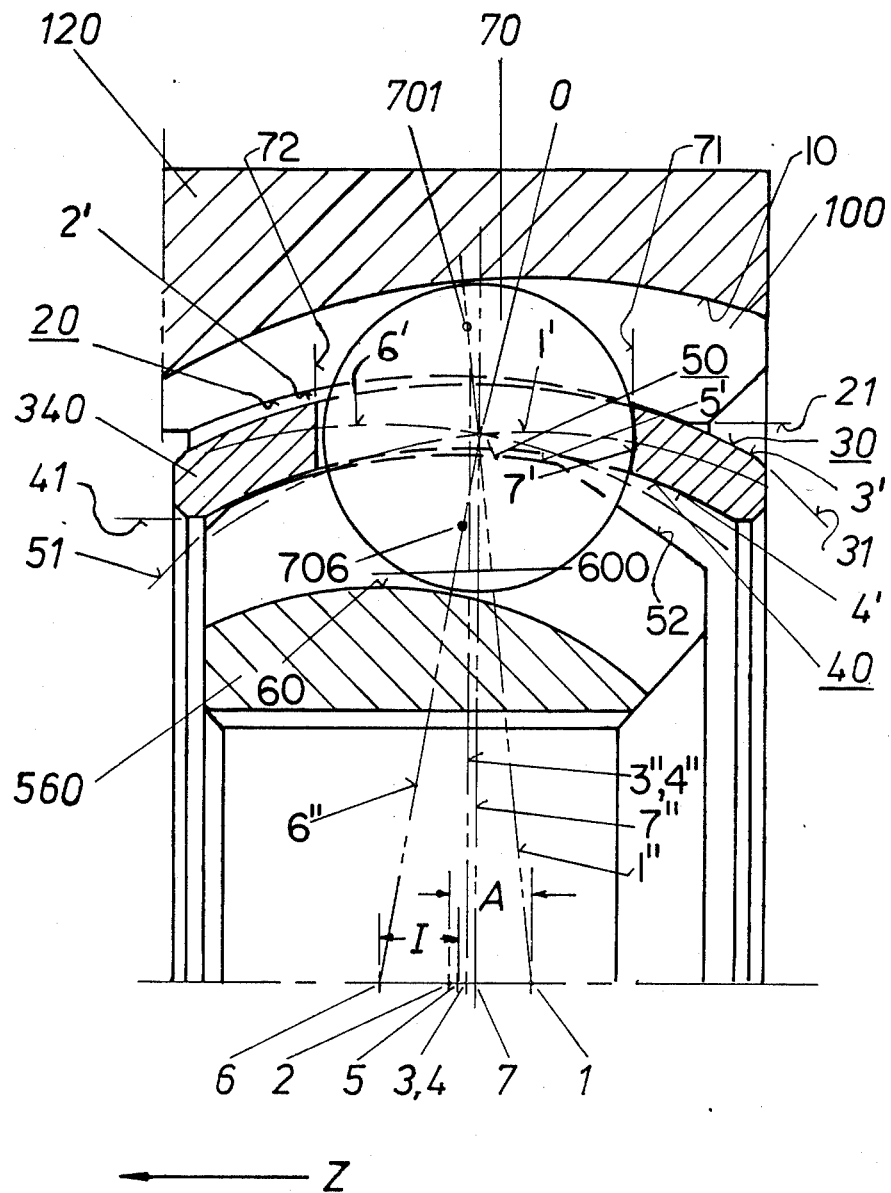
Figure 2A:
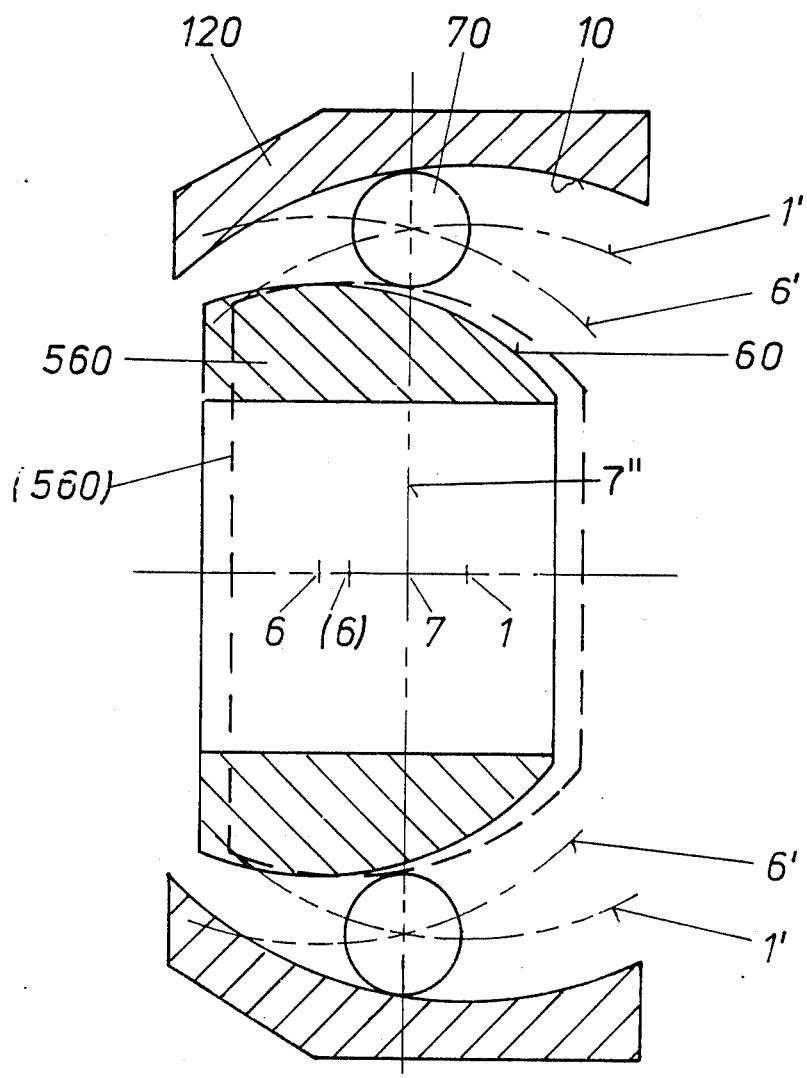
Figure 2B:
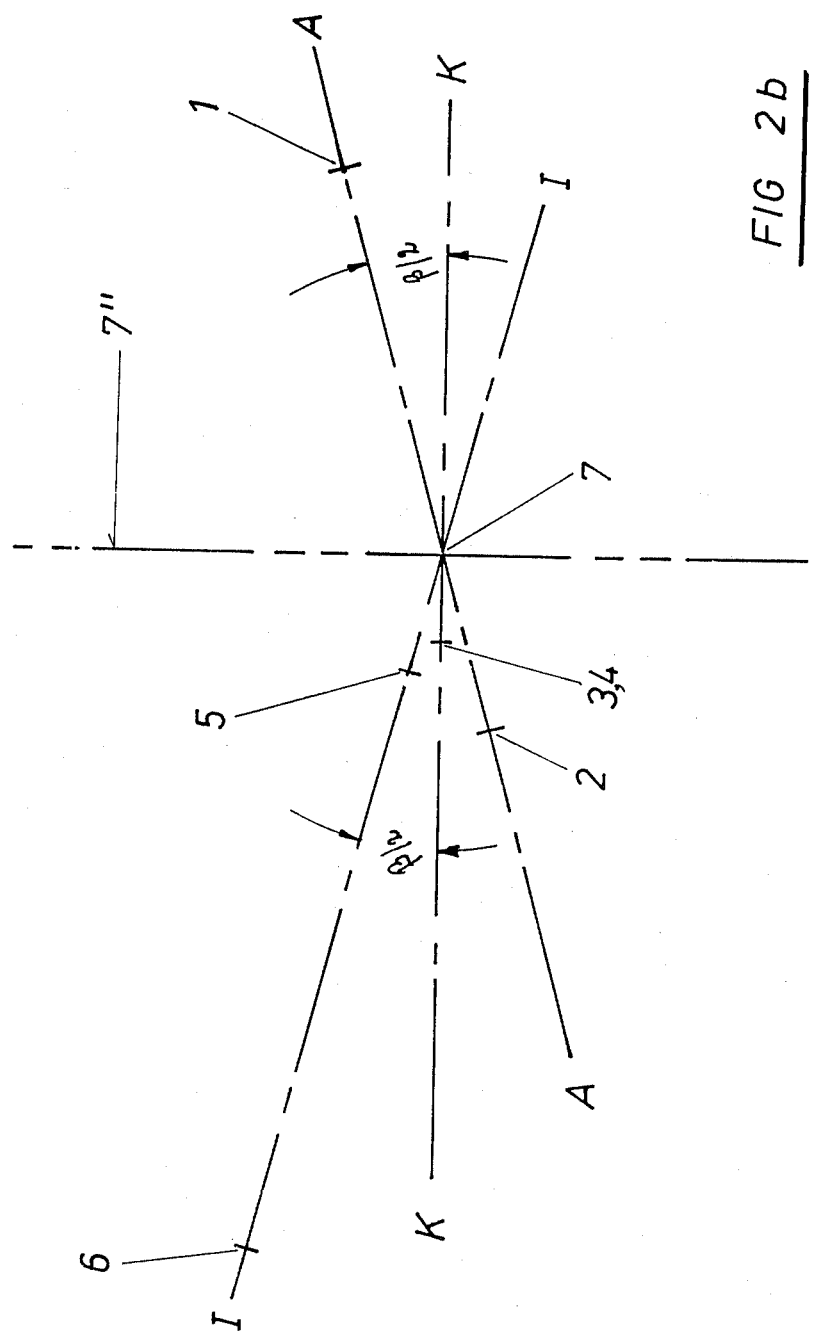
Figure 4:
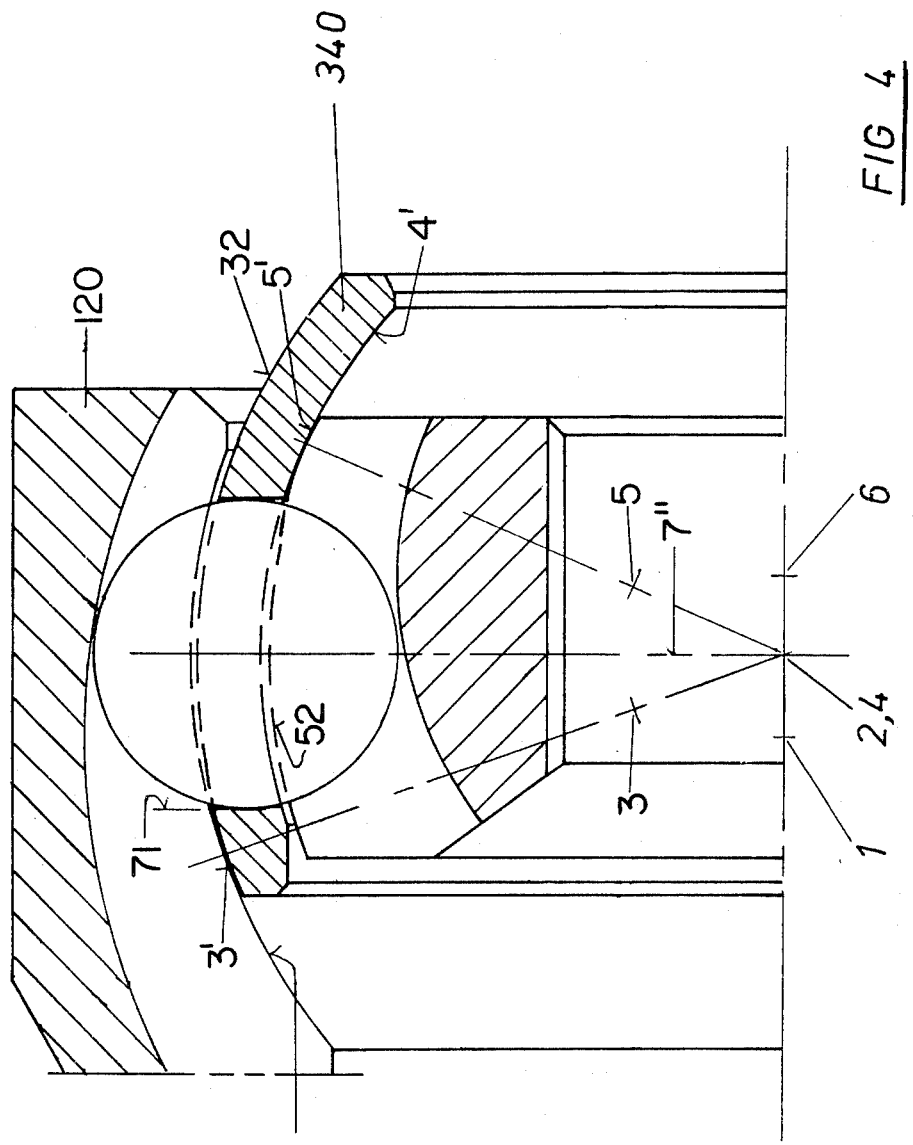
Figure 6:
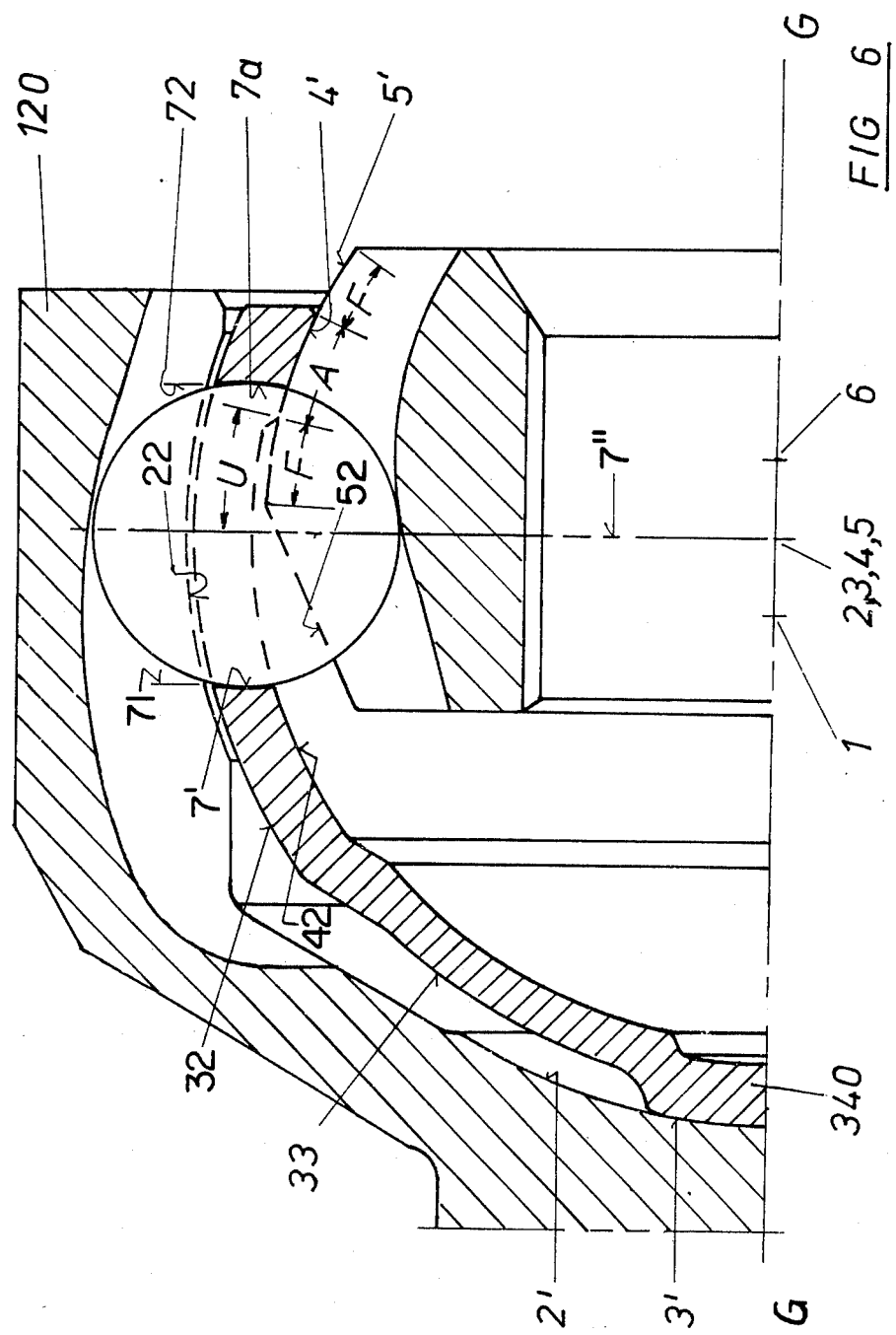
Figure 8:
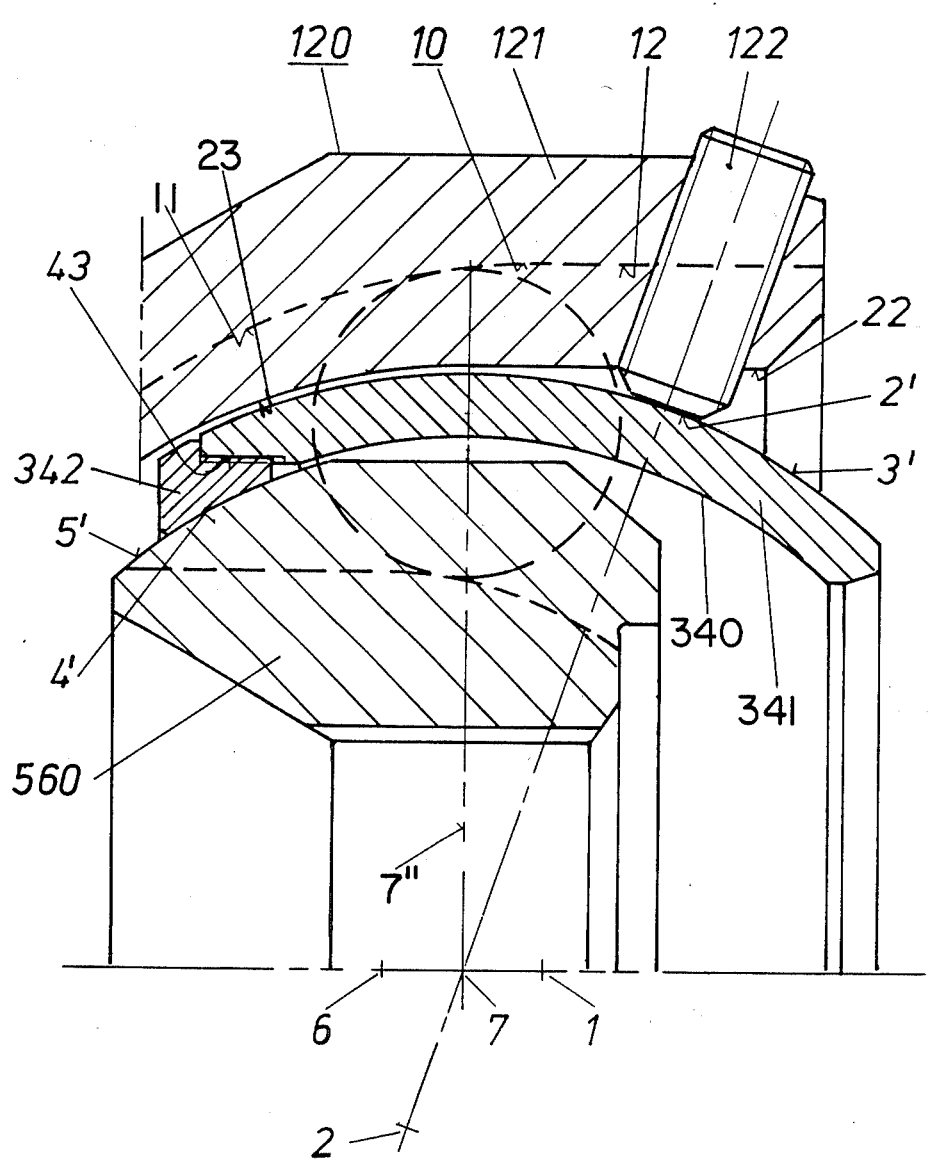

Various exemplary embodiments of the invention, from which further inventive features emerge, are described below, in principle, with reference to the diagrammatic drawings in which:

FIG. 1 shows a half longitudinal section of a joint of known design in the straight position to illustrate the clearance and control conditions, FIG. 2a shows a diagram of a joint according to FIG. 1, FIG. 2b shows a diagram of the axes of rotation of the joint of FIG. 1 in the angled position to illustrate the kinematics, FIG. 3 shows a half longitudinal section of a joint according to the invention, the outer surfaces of the inner part and of the cage serving as control surfaces, FIG. 4 shows a half longitudinal section of a joint according to the invention, the inner surfaces of the outer part and of the cage serving as control surfaces, FIG. 5 shows a half longitudinal section of a joint according to the invention, the inner surface of the outer part and the outer surface of the inner part being designed as control surfaces, FIG. 6 shows a half longitudinal section of a joint according to the invention, the fixing or centering of the cage in relation to the outer part being located in the region of the main axis of rotation, FIG. 7 shows a half longitudinal section according to the invention, the fixing or centering of the inner part in relation to the cage being located in the region of the main axis of rotation by means of a separate element, FIG. 7a shows a half longitudinal section of the inner part similar to FIG. 7, the end of a drive shaft serving as a guide surface, FIG. 8 shows a half longitudinal section of a joint according to the invention, the bearing surfaces being made on the outer part and the cage on separate elements and FIG. 9 shows a longitudinal section of a joint according to the invention, the ball tracks being arranged obliquely in alternate directions.

FIG. 1 shows a joint of known design with a relatively large clearance fit between the outer part (120) and the cage (340) and between the cage (340) and the inner part (560). The four centering surfaces (2') on the outer part, (3' and 4') on the cage and (5') on the inner part are predominantly spherical, that is to say, in the straight position of the joint, the spherical surfaces are located on both sides of the plane of symmetry (3", 4") or the ball plane (7") respectively. The tracks (1') of the outer part (120) and (6') of the inner part (560) are located in the plane of cross section and have their center points (1 and 6) on the main axis of rotation. The track bottoms are designated by (10) and (60). The balls (70) are retained axially between cage window surfaces (72) and cage-window support surfaces (71). The cage windows are made symmetrically to the concentric centering surfaces (3' and 4') of the cage, so that the ball plane (7") originally coincides with the plane of symmetry (3" and 4") of the centering surfaces (3' and 4'). The points (701 and 706) are the contact point of the ball in relation to the track surfaces (100, 600) of the outer part and inner part respectively and are each located on the plane (1" and 6"), which pass through the ball center point (0) and the track center points (1 and 6) respectively or are perpendicular to the ball track. In the straight position of the joint, both points are located on one side of the ball plane, with the result that an axial force vector is produced by each ball. With an increasing joint angle, the axial force vector of each ball varies during one revolution. From a specific joint angle onwards, the contact points of individual balls located on one side of the periphery in the region of the pivot axis of the joint, could lie on the other side of the ball plane, so that the window surface (72) is loaded at this interval, but this occurs with a lower intensity and frequency than the loading between the balls and the window support surfaces (71). This angle depends on the inclination of the plane (1" and 6" respectively) and on the position of the contact points as well as on the inclination on the ball-track plane in relation to the meridian plane, if the tracks are not in the meriodian plane. In a typical application in the front-wheel drive of a motor vehicle, the loading on the window surface (72) and on the dents arising thereby is quite insignificant. On the opposite, the dents (7') on the window support surface (71) are significant and, for example in the case of balls with a diameter of 15 mm, attain a depth which can amount to several tenths of a millimeter, depending on the loading. However, the sum of all the forces on the window support surfaces (71) always remains greater than those on the window surfaces (72), so that contact between the centering surfaces lies always on one side.

The joint is shown under the effect of torque, so that the axial displacement of the outer part (120) and the inner part (560) in relation to the cage (340) in the direction Z is evident. As a result of this axial displacement, the center points (2) of the centering surface (2') and (5) of the centering surface (5') are likewise displaced according to the clearance conditions.

The high point-loading of the ball (70) on the window support surface (71) gives rise to a running-in brinelling (7'). The balls shift in the direction of the brinelling, so that the ball plane (7") is no longer identical to the planes of symmmetry (3" and 4" respectively) of the cage centering surfaces and intersects the main axis at the point (7). As a result of the displacements illustrated, the distance between the ball plane and the center point of the tracks of the outer part (7-1) is less than the axial offset of the outer part "A" by the amount (2-7). The lever arm (6-7) of the inner part becomes greater than the axial offset "I" of the inner part by the amount (5-7). The large difference between the lever arms gives rise to great inaccuracy of the steering. The centering surfaces are no longer symmetrical in relation to the ball plane, with the result that constrained running occurs as the deflection angle increases.

Because of the axial loading, contact between the centering surface (3') of the cage and the centering surface (2') takes place at the cylindrical orifice (21) in the outer part. To guarantee contact over the entire periphery, especially in the case of relatively large clearance fits, the surface (21) should be produced according to the invention concentrically with the centering surface (2'), preferably in one chucking operation. The same applied to the chamfer (51) and the centering surface (5') of the inner part. When the joint angle is relatively large, contact over the entire periphery is no longer possible, so that certain concentricity errors between the centering surfaces are also unavoidable, especially with larger clearance fits. The surfaces (31 and 41) adjoining the centering surfaces (3' and 4') are likewise to be produced preferably concentrically with the adjacent centering surfaces.

Under load, there arises in each case an approximately elliptical contact surface between the balls (70) and the track surfaces (100 and 600), the main axes of which are located on the plane (1" and 6") extending perpendicularly to the track. The contact points (701 and 706) are the center points of the ellipses.

FIG. 2a shows a diagrammatic representation of a joint according to FIG. 1, showing the bottom of the tracks (10), the ball tracks (1') and the center point of the tracks (1) of the outer part (120), and also the bottom of the tracks (60), the ball track (6') and the center point of the tracks (6) of the inner part (560), as well as the balls (70). The lever arm of the outer part (1-7) is less than that of the inner part (6-7). The broken-line contour (560) of the inner part would correspond to equal lever arms with a center point (6). The clearance between the balls and the tracks mainly takes the form, in practice, of rotational play. However the loading on the balls remains uniform. The meriodional planes are slightly distorted as a result of the rotational play.

In FIG. 2b, the axis of rotation AA of the outer part is pivoted in one direction about the pivot axis (7) by an angular amount of $\beta/2$, and the axis of rotation II of the inner part is pivoted in the other direction by the same amount. The deflection angle of the joint amounts to $\beta$, and the pivot axis lies in the ball plane (7"). KK is the axis of the cage, unchanged. The center points (1) of the tracks and (2) of the centering surface of the outer part as well as the center points (6) of the tracks and (5) of the centering surface of the inner part, and also the common center point (3,4) of the cage centering surfaces are shown enlarged. The state of eccentricity of the guide surfaces, caused by the axial displacement of the respective center points, becomes evident. The centering-surface center point (5) of the inner part is located above the axis of rotation of the cage or above the centering center point of the cage (3,4) whereas the centering-surface center point (2) of the outer part is located underneath this, so that the centering surfaces and likewise the balls above the axis of rotation of the cage experience less radial play and those underneath the axis of rotation of the cage correspondingly more radial play. This forced eccentricity worsens the degree of uniformity of the load on the balls and centering surfaces to a great extent. Errors of a few hundredths of a millimeter in the approach to the contact surfaces of a joint with 15 mm balls can already result in a considerable reduction in the performance of such a joint.

FIG. 3 shows a joint according to the invention in a state under torque, after running-in, the control accuracy being assured up to the maximum joint angle. The outer surface (3') of the cage (340) and the outer surface (5') of the inner part (560) serve as control surfaces with their center points (3 and 5) on the ball plane (7"). (7") is virtually the end position of the ball plane after the running-in brinelling has occurred. The hollow spherical surfaces (2') of the outer part (120) and (4') of the cage (340) are provided as bearing surfaces. The offset of the center point (2) from the center point (3) is a product of the radial clearance fit between (2' and 3') and of the distance of the contact point between (2' and 3') from the ball plane considering the thermal expansion and the elasticity of the parts. The same applies to the center point (4).

The arc length of the guide surface (5') on both sides of the points of contact with (4') corresponds approximately to half the maximum deflection angle of the joint in each case, so that guidance of the bearing surface is always guaranteed over the entire periphery. Contact is, of course, interrupted by the ball tracks. The remaining outer surface (52) of the inner part can be designed as desired from the point of view of control and is, in this case, made spherical with the center point (6) which is also the center point of the tracks of the inner part, so that the track depth remains constant in this region. In this case, the spherical guide surface (5') does not extend up to the ball plane. The arc length of the guide surface (3') is likewise designed for the maximum deflection angle of the joint. The center point (1) of the tracks of the outer part is at the same distance from the ball plane as the center point (6) of the inner part, so that the mirror image of the tracks is ensured both in the straight position and at any joint angle.

The offset (1-2) of the outer part is greater here than the offset (5-6) of the inner part, but the two lever arms (1-7" and 6-7") are equal, this being the prerequisite for constant velocity behavior. It is worthy of note that the outer and inner centering surfaces (3' and 4') of the cage do not run concentrically. According to the teaching of the invention, the center points (3 and 5) of the guide surfaces (3' and 5') are located on the ball plane (7"). Because of the desired clearances, the ball radii of the bearing surfaces (2' and 4') are each greater than those of the associated guide surface, thus resulting in an offset of the center points (2 and 4) in relation to (3 and 5).

Since the guide surfaces (3' and 5') touch the bearing surfaces (2' and 4' respectively) at the end of their width, the adjoining surfaces of revolution (21 and 41)

are preferably to be produced coaxially with the adjacent bearing surfaces, in one chucking operation, for example by means of grinding. It is also possible, of course, to produce only the parts of the bearing surfaces directly in contact with the guide surface with the necessary accuracy, for example by means of grinding, otherwise lower accuracy, for example, turning, would be sufficient.

The joint in FIG. 4 is similarly shown after the necessary running-in of the window support surfaces (71) and under torque. In contrast to FIG. 3, the hollow spherical surfaces (2') of the outer part (120) and (4') of the cage (340) are designed as guide surfaces here, their center points (2 and 4) being located on the ball plane (7"). The respective bearing surfaces (3' and 5') are designed, in longitudinal section, with a conformity to their guide surfaces, so that their profile center points (3 and 5) are located on the radii connecting the contact points to the guide center points. Otherwise, the remaining surfaces (32 and 52) which do not have to perform any control functions are appropriately made concentric with (2 and 4).

A further interesting design is shown in FIG. 5, in which the bearing surfaces (3' and 4'), being basically linear as edges on the outer and inner surfaces of the cage (340), are as far as possible from the ball plane. The guide surfaces (2' and 5') are, of course, shown spherical with their center points on the ball plane (7"). Here also is the brinelling of the window surfaces taken into account. Any flattening or adaptation of the bearing surfaces must be allowed for in the calculation of the functional dimensions. An advantage of this design is the rapid and accurate production of the bearing surface. In this design, the balls are introduced in the cage window with a prestress which is so high that it corresponds approximately to the expected depth of the brinelling (7'), so that, even after the running-in process which mainly takes place on the window support surface (71), the balls remain free of play. To improve the minimum track depth on the outer part, the ball track (1') of the outer part consists of a circle with the center point (1) on the main axis, and then of a tangent which is also evident from the path of the track bottom (10) with the portions (11 and 12). Because of the mirror image of the ball tracks (1' and 6'), the improvement in the track depth in the region (12) of the outer part (120) naturally involves impairment of the corresponding track parts (62) of the inner part (560), but in a place where there is, anyhow, abundant track depth on the inner part. The conical surface (311), adjacent to the bearing surface (3'), and the plane surface (312) are produced preferably in one chucking operation, and the same applies to the conical surface (411) and the cylindrical surface (412) of the inner contour of the cage.

A bearing surface on the cage guarantees, because it always extends parallel to the ball plane irrespective of the joint deflection angle, that the sum of the axially acting forces in the direction of the window support surface remains perpendicular to the bearing surface.

In FIG. 6 the guide surface (2') of the outer part (120) and the bearing surface (3') on the cage (340) are located in the region of the main axis of rotation. As a result, the supporting forces between (2') and (3') are minimal and correspond to the axial force vector caused as a result of the track inclination. Furthermore, a radial eccentricity of the guide surface (2'), for example in relation to the tracks of the outer part (120), will have a very slight effect on the position of the ball plane (7") which can otherwise be pivoted out of its desired position as a result of eccentricities of the guide or bearing surfaces. Here also, the inner contour (22) of the outer part and the outer contour (32) of the cage are appropriately arranged with a large amount of play, concentrically to the center of rotation of the joint, because according to the invention guiding along the ball plane is not necessary. The remaining outer contour (33) of the cage (340) is set back, to allow the cage to be introduced in the outer part into a position pivoted 90°, as is known per se. The joint referred to here is a six-ball joint. The center points (2 and 3) of the centering, fixing or positioning surfaces (2' and 3') are located on the ball plane (7"). The same applies to the bearing surface (4') and the guide surface (5') with their center points (4 and 5). In both cases, there is two-dimensional or surface contact. The bearing surface (4') of the cage (340) has an arc length of A and a minimum distance U from the ball plane. U is intended to correspond to the arc length of the maximum friction angle between (4') and (5') and should preferably be greater than the maximum friction angle, which is the dimension for self-locking. The arc length of the guide surface (5') outside the region A is calculated as F in each case. Here also, minimum contact between the bearing surface and guide surface should always be assured up to the maximum joint angle, half the deflection angle corresponding to an arc length of F+A. In this case, the brinelling (7' and 7a) on the window support surfaces (71) and window surfaces (72) in incorporated in the cage. The shape of (7') and (7a) can be derived from the kinematics of the particular joint on the basis of the movement of the ball in relation to the cage, but corresponds approximately to a spherical cup with a radius greater than the ball radius. Due to the fact that, especially when the running angle of the joint is small, the cage can rotate about its main axis in the scope of the cage window length, it is recommended to produce the brinelling dents by means of cold extrusion, milling or grinding, etc, whereby they extend in a peripheral direction in the form of a groove with a cross section which approximates to a radius greater than the ball radius. Here, the inner surface (42) of the cage is set back and made spherical.

The special feature of the joint in FIG. 7 is that the guide surface (5') of the inner part (560) is provided on the separate element (562) which is fitted in the inner member (561) after the inner member has been inserted into the cage (340). The bearing surface of the cage (4') has its center point (4) on the main axis which has a greater radius than the spherical surface (5'), the center point of which is located on the ball plane, so that point contact is obtained (theoretically). The outer surface (3') of the cage serves as a guide surface with its center point (5') which is likewise located on the ball plane (7"). The bearing surface (2') on the outer part (120) is made with a conformity, so that the radius of this surface is greater, in longitudinal section, than that of the guide surface and is located at the point (2). However, the bearing surface (2') can also be made spherical, likewise with a center point (2), so that conformity is obtained in all directions, which can have an advantageous effect on the relative movement of the centering surfaces (2' and 3') in relation to one another. The remaining inner surface (22) of the outer part is set back, to prevent any contact with the guide surface, even under the effect of thermal expansion, elasticity, wear, etc. The distance U between the bearing surface (2) and the ball plane also guarantees that there is no jamming or self-locking at this point, even in emergency running, for example, in the case of a lack of lubrication, because U is at least equal to the friction angle of the pairs of surfaces (2' and 3') in the dry state. The outer contour (52) of the inner piece (561) runs parallel to the track bottom (60), so that both have one center point (6), with the result that the track depth on the inner part is constant over the entire deflection angle range.

FIG. 7a illustrates another alternative form of the inner part (560) of FIG. 7. The guide surface (5') is located at the end of the drive shaft (780) which is connected to the inner piece (561) by means of a spline. The spring ring (781) guarantees that the part (561) is fixed to the shaft (780) and that the guide surface (5') is positioned exactly with its center point (5). The position of the guide surface (5') can be influenced by means of the width of the spring ring, because the guide surface (5') is always loaded by the axial force component. The turned groove (782) serves for retaining the inner part when the intermediate shaft (780) is introduced or assembled.

In FIG. 8, both bearing surfaces (2' and 4') are made on separate parts (122 and 342). The outer surfaces (3' and 5') of the cage piece (341) and of the inner part (560) form, here, the guide surfaces with the common center point (7) in the ball plane (7''). The part (342) is screwed into the threaded bore (43) on the cage part (341). The bearing surface (4') is spherical and is adapted to the guide surface (5'). The hollow spherical bearing surface (2') of the setscrew (122) touches the guide surface (3') with all-round conformity inasmuch as the radius of this plane surface is greater than that of the guide surface (3') with a center point (2) located on the longitudinal axis of the setscrew. The additional part (342) can be screwed into the cage (341) after the inner part (560) has been fitted axially. The same applies to setscrews (122) which are screwed into the outer piece (121) after the axial fitting of the inner part together with the cage (340) including the balls. To make this axial fitting possible, the inner contour of the outer piece (121) consists of a spherical surface (23) and then of a cylindrical surface (22), and the track path is also designed in a corresponding way, as is evident from the track bottom (10) with a circular track piece (11) having a center point (1), followed by a track piece (12) parallel to the axis. The tracks of the inner part are made in a mirror image and are likewise necessarily free of undercuts.

The two separate parts (122) and (342) allow axial adjustment of readjustment of the lever arms (1-7) and (6-7) respectively.

The tracks (1') of the outer part (120) of the joint in FIG. 9 are located in meridional planes, run in a straight line and extend obliquely to the main axis, but in alternate directions, so that the number of tracks (1') is provided in pairs and so that the tracks (1') located opposite one another extend parallel to one another. The corresponding tracks (6') of the inner part (560) run in a mirror image to these, and therefore in pairs likewise. As a result, the inner part can be displaced in relation to the outer part of both in the straight position and in the angled position; the cage (340) is displaced half the distance. Consequently, the cage support surfaces (71) are located on one side of the ball plane (7'') for half the balls (70) and on the other side of the ball plane (7'') for the other half. The position of the contact points of the particular ball is located on the side of the cage window surface (72) irrespective of the direction of torque.

The oblique angle of all the tracks is essentially equal, so that the axial force components on the cage support surfaces (71) and on the outer and inner parts cancel each other out, so that there is no displacement of these parts in relation to one another as a result of torque, except in the region of elastic deformation. The inner surface (25) of the outer part is essentially cylindrical and the outer surface (35) of the cage is essentially spherical, so that the cage (340) is centered radially in the outer part. According to the idea of this invention, the tracks (1' and 6') mirror one another in relation to the ball plane, after the brinelling (7') has been engraved on the cage support surfaces (71) during the running-in phase. To achieve this, the window support surface is offset, during production, by the amount of brinelling. In the present design, the cage window surfaces (71 and 72) of the balls located opposite one another are produced so as to be inclined by this amount, so that the window surfaces located opposite one another can be produced by means of a simple broaching operation R.

Track-controlled sliding joints basically in the design according to FIG. 9 are known, but in these the tracks are not located in meridional planes, but in planes running parallel to the main axis or in the manner of a screw, and in these joints the tracks of one part are also arranged obliquely in alternate directions. In these designs, the contact points of the balls are located on one side of the ball plane or the other depending on the direction of rotation, so that the measures mentioned above apply only to those joints which are mainly loaded in one direction of rotation. For example, drive joints in motor vehicles run mainly in one direction (forwards).

When such joints are used, for example in machine engineering, for both directions of rotation, the correction of the brinelling of the case windows can be compensated only by incorporating the brinelling and/or by increasing the prestress between the ball window and cage window so as to neutralise the brinelling.

I claim:

1. In a constant velocity joint comprising an outer part having an inner surface in which grooves are provided, an inner part having an outer surface in which grooves corresponding to said grooves of said outer part are provided, a cage interposed between said inner and outer parts, said cage having an outer and an inner surface of generally spherical shapes, said inner surface of said outer part and said outer surface of said cage providing bigger centering surfaces mating with each other, said outer surface of said inner part and said inner surface of said cage providing smaller centering surfaces mating with each other, said outer and inner parts and said cage being adapted for relative angular travel about a joint center, said cage having windows therein, and balls disposed in said windows, the centers of said balls lying in a ball plane, each of said balls being received in one of said grooves of said outer and of said inner parts, the improvement wherein each said centering surface consists of one bearing surface of narrow axial length being placed remote from said ball plane and spherical guide surfaces extending on both sides of said bearing surface, the center of each said guide surface lying on said ball plane, said bearing surface of said smaller centering surfaces lying on one side of said ball plane, and said bearing surface of said bigger centering surfaces lying on the other side of said ball plane, whereby with the joint in the straight position and under torque, the contact points of said balls with said grooves of said outer and said inner part are located one said one side of said ball plane, the tracks of said balls in said grooves of said outer part running as a mirror image of said corresponding tracks of said inner part in relation to said ball plane.

2. A constant velocity joint as claimed in claim 1 wherein one of said mating centering surfaces is located in the region of the axis of rotation of the joint.

3. A constant velocity joint as claimed in claim 1, wherein the arc length of each said guide surface on each of its corresponding bearing surface is at least approximately equal to half of the maximum operating angle of the joint.

4. A constant velocity joint as claimed in claim 1, wherein each said bearing surface is at a distance from said ball plane whereby the acute angle included between said bearing surface, said joint center and said ball plane always remains greater than the angle of friction between each said bearing surface and its corresponding guide surface, said distance being preferably remotest from said ball plane.

5. A constant velocity joint as claimed in claim 1, wherein one of said bearing surfaces is an edge of two rotational surfaces, so that line contact with its corresponding guide surface is initially obtained, whereby said mirror image of said tracks being established after considering the axial displacement of the member of the joint providing said bearing surface as a result of the running in wear of said edge.

6. A constant velocity joint as claimed in claim 1, wherein one of said bearing surfaces is spherical having the same center and radius as its corresponding guide surface, so that surface contact with its corresponding guide surface is obtained.

7. A constant velocity joint as claimed in claim 1 wherein one pair of said mating centering surfaces is matched with a given conformity, whereby the radius of curvature of the convex centering surface is less than the radius of curvature of the corresponding concave centering surface taken in longitudinal and/or in cross section.

8. A constant velocity joint as claimed in claim 7, wherein said bearing surface provided by said outer part is a rotational surface of circular profile, the radius of which is greater than the radius of said corresponding convex guide surface of said cage, the center of said bearing surface lying on the extension of the line joining the contact point of said mating centering surfaces to the center of said guide surface, in the extreme said bearing surface being a conical surface having an infinite radius of curvature.

9. A constant velocity joint as claimed in claim 7, wherein said bearing surface provided by said inner part is a rotational surface of circular profile, the radius of which is less than the radius of said corresponding concave guide surface of said cage, the center of said bearing surface lying on the line joining the contact point of said mating centering surfaces to the center of said guide surface.

10. A constant velocity joint as claimed in claim 7, wherein said bearing surface is a multiple of spherical surfaces provided on the lands between two of said grooves.

11. A constant velocity joint as claimed in claim 1, wherein one said centering surface, preferably said bearing surface is provided on a separate element or elements being incorporated with said inner part, said cage, or said outer part.

12. A constant velocity joint as claimed in claim 11, wherein said separate element or elements is or are axially adjustable in relation to its or their associated parts.

13. A constant velocity joint as claimed in claim 11, wherein said separate element is the end portion of a drive shaft fixed to said inner part.

14. A constant velocity joint as claimed in claim 1, wherein one said centering surface, preferably said bearing surface, is raised relative to its adjacent surface assuring ample clearance between said outer part and said cage and/or between said cage and said inner part at least along said ball plane.

15. A constant velocity joint as claimed in claim 14, wherein the contour of said outer surface of said inner part, not involving any of said centering surfaces, is at a constant distance from the bottom of said grooves.

16. A constant velocity joint as claimed in claim 1, said windows having window surfaces on said one side and window support surfaces on the other side of said ball plane, wherein dents are at least partially provided in said window support surfaces or in both said window support surfaces and window surfaces during the production of the cage, at least to reduce the axial displacement of said ball plane relative to said cage as a result of the brinelling of said window support surfaces and to reduce undue axial clearance between said balls and said windows.

17. In a constant velocity joint comprising an outer part having an inner surface in which grooves are provided, an inner part having an outer surface in which grooves corresponding to said grooves of said outer part are provided, a cage interposed between said inner and outer parts having one outer and one inner concentric spherical surfaces having a common cage center, said inner surface of said outer part providing a spherical centering surface mating with said spherical outer surface of said cage, said outer surface of said inner part providing a spherical centering surface mating with said spherical inner surface of said cage, said outer and inner parts and said cage being adapted for relative angular travel about said cage center, said cage having windows therein, and balls each of which is disposed in said windows, the centers of said balls lying in a ball plane, each of said balls being received in one of said grooves of said outer and inner parts, whereby with the joint in the straight position and under torque, the contact points of said balls with said grooves of said outer and of said inner parts are located on one side of said ball plane, said windows having window support surfaces on the other side of said ball plane, the improvement wherein the center of curvature of said centering surface of said outer part is placed at a distance from said cage center towards said one side by an amount equal and compensating the axial displacements between said outer part and said cage as a result of play, elastic deformation, running in wear and thermal expansion and/or the center of curvature of said centering surface of said inner part is placed at a distance from said cage center towards said one side by an amount equal and compensating the axial displacements between said inner part and said cage as a result of play, elastic deformation, running in wear and thermal expansion and said ball plane is placed at a distance from said cage center towards said one side by an amount equal and compensating the axial displacements between said ball plane and said cage as a result of said brinelling as well as a result of said elastic deformation of said window support surfaces, whereby, after the running in period of the joint, the tracks of said balls in said grooves of said outer part run as a mirror image of the corresponding tracks of said inner part in relation to said ball plane, there being pressure contact between said balls with said tracks and said window support surfaces and consequently between said centering surfaces only at conditions of application of said torque.

18. A constant velocity joint as claimed in claim 1, wherein said ball plane lies at a distance from said center of said guide surfaces towards said one side by an amount equal and compensating the axial displacements between said ball plane and said cage as a result of said brinelling and said elastic deformation of said window support surfaces.

19. In a constant velocity joint comprising an outer part having an inner surface in which grooves are provided, an inner part having an outer surface in which grooves corresponding to said grooves of said outer part are provided, a cage interposed between said inner and outer parts, said cage having an outer and an inner surface of generally spherical shapes, said outer and inner parts being adapted for relative angular travel about a center of the joint and for an axial plunging motion, said cage having windows therein, and balls disposed in said windows, the centers of said balls lying in a ball plane, each of said balls being received in one of said grooves of said outer and inner parts, whereby with the joint in the straight position and under torque, the contact points of each of said balls with its corresponding said grooves of said cuter and said inner parts are located on one side of said ball plane, said windows having window support surfaces on the other side of said ball plane, the imrovement wherein each of said cage windows is displaced axially away from said joint center towards said one side by an amount equal and compensating the axial displacements between said ball plane and said cage as a result of said brinelling and said elastic deformation of said window support surfaces.

* * * * *

UNITED STATES PATENT AND TRADEMARK OFFICE
CERTIFICATE OF CORRECTION

PATENT NO. : 4,575,362

DATED : March 11, 1986

INVENTOR(S) : Sobhy Labib GIRGUIS

It is certified that error appears in the above—identified patent and that said Letters Patent is hereby corrected as shown below:

Claim 3, Column 13, Line 11, insert the word --side-- after "each".

Signed and Sealed this

Twenty-fourth Day of June 1986

[SEAL]

Attest:

Attesting Officer

DONALD J. QUIGG

Commissioner of Patents and Trademarks